(12) United States Patent
Bercea et al.

(10) Patent No.: US 12,300,030 B2
(45) Date of Patent: May 13, 2025

(54) DETECTION DEVICE FOR RECOGNIZING AN OBJECT AND/OR A PERSON, METHOD, COMPUTER PROGRAM AND STORAGE MEDIUM

(71) Applicant: Robert Bosch GmbH, Stuttgart (DE)

(72) Inventors: Cosmin Ionut Bercea, Haar (DE); Tamas Kapelner, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 447 days.

(21) Appl. No.: 17/698,511

(22) Filed: Mar. 18, 2022

(65) Prior Publication Data
US 2022/0301345 A1 Sep. 22, 2022

(30) Foreign Application Priority Data
Mar. 19, 2021 (DE) .......................... 102021202681.8

(51) Int. Cl.
*G06V 40/00* (2022.01)
*G06T 7/292* (2017.01)
*G06V 10/82* (2022.01)
*G06V 20/52* (2022.01)
*G06V 40/16* (2022.01)

(52) U.S. Cl.
CPC ............ *G06V 40/173* (2022.01); *G06T 7/292* (2017.01); *G06V 10/82* (2022.01); *G06V 20/52* (2022.01); *G06T 2207/30196* (2013.01)

(58) Field of Classification Search
CPC ...... G06V 40/173; G06V 10/82; G06V 20/52; G06T 7/292; G06T 2207/30196; G06T 2207/10016; G06T 2207/30232; G06T 7/20; G06T 7/70; G06T 2207/20084; H04N 7/181

USPC ......................................................... 382/103
See application file for complete search history.

(56) References Cited

U.S. PATENT DOCUMENTS

| | | | |
|---|---|---|---|
| 10,217,003 B2* | 2/2019 | Renkis ............ | G08B 13/19656 |
| 10,410,086 B2* | 9/2019 | Bapat ...................... | G06F 18/23 |
| 10,579,877 B2* | 3/2020 | Guttmann ............. | G06V 20/41 |

(Continued)

FOREIGN PATENT DOCUMENTS

| | | |
|---|---|---|
| CN | 107316317 A | 11/2017 |
| DE | 102019212978 A1 | 3/2020 |
| GB | 2529888 A | 3/2016 |

*Primary Examiner* — Neil R McLean
(74) *Attorney, Agent, or Firm* — Michael Best & Friedrich LLP

(57) ABSTRACT

Detection device 1 for recognizing an object and/or a person 3, 3a, b, c in a monitoring area 2 monitored with a plurality of cameras 4, 4a, b, c, having a plurality of analysis modules 6, 6a, b, c, wherein each analysis module 6, 6a, b, c in each case preferably has and/or forms a neural network, wherein the analysis modules 6, 6a, b, c in each case have a data connection to at least one camera 4, 4a, b, c, wherein monitoring data from the connected cameras 4, 4a, b, c are provided in each case to the analysis modules 6, 6a, b, c, having a shared memory module 7, wherein the analysis modules 6, 6a, b, c have a data connection to the shared memory module 7, wherein the analysis modules 6, 6a, b, c are designed in each case to retrieve memory data associated with the monitoring data from the shared memory module 7, wherein the analysis modules 6, 6a, b, c are designed in each case to determine features, object features and/or person features on the basis of the monitoring data and the memory data.

13 Claims, 2 Drawing Sheets

(56) References Cited

U.S. PATENT DOCUMENTS

2018/0241972 A1\* 8/2018 Lee .................. H04N 7/181
2019/0166332 A1\* 5/2019 Perwass .......... G08B 13/19641
2019/0392550 A1\* 12/2019 Uchiyama ................ G06T 7/70
2020/0117906 A1\* 4/2020 Lee ..................... G06V 10/764

\* cited by examiner

DETECTION DEVICE FOR RECOGNIZING AN OBJECT AND/OR A PERSON, METHOD, COMPUTER PROGRAM AND STORAGE MEDIUM

BACKGROUND OF THE INVENTION

The invention relates to a detection device for recognizing an object and/or a person in a monitoring area, wherein the monitoring area is monitored with a plurality of cameras. Features for recognizing the object and/or the person are determined on the basis of monitoring data from the cameras.

Methods for image-based recognition of objects or persons can be found in many technical domains. Persons can be recognized, re-recognized and/or tracked, for example, on the basis of camera recordings in the monitoring of airports, railroad stations and/or other public areas. To do this, for example, the video or image recordings provided by the cameras are examined for features which are characteristic of the person and/or the object.

Document DE 10 2019 212 978 A1, for example, which probably forms the closest prior art, describes a monitoring device for person re-recognition in a monitoring area, wherein image sequences of the monitoring area are recorded from the monitoring area with at least one camera. The monitoring images comprising the image sequences are examined for the presence of at least one re-recognition feature, wherein the person is deemed to be re-recognized if the feature(s) has/have been identified. The camera for recording the monitoring images comprises a fisheye lens.

SUMMARY OF THE INVENTION

A detection device is proposed. A method for recognizing an object and/or a person in a monitoring area, a computer program and a storage medium having the computer program are further proposed.

The invention relates to a detection device for recognizing an object and/or for recognizing a person. Recognition is understood to mean, in particular, a re-recognition of an already known and/or saved object and/or person. Recognition is to be understood to mean, for example, the identification of the object and/or the person based on characteristic features, wherein the characteristic features comprise, for example, shape, contrast, clothing, size and/or other metadata. The recognition of the object and/or the person is performed in a monitoring area, wherein the monitoring area is monitored by means of a plurality of cameras, in particular using image and/or video technology. The monitoring area can be an outdoor area or an indoor area.

The monitoring area is monitored with a multiplicity of cameras using video technology. In particular, the monitoring area is monitored with at least one, preferably more than 20 or 100 cameras. The cameras are arranged to monitor all or part of the monitoring area. In particular, the cameras are arranged to monitor and/or record the monitoring area from different perspectives, angles of view and/or positions. The cameras are designed to provide monitoring data, in particular to provide it externally. The plurality of cameras can be part of the detection device, or alternatively the plurality of cameras are not an actual part of the detection device, but instead have only a data connection or an electronic connection to the detection device. The monitoring data from a camera in each case comprise monitoring images and/or monitoring videos for the monitoring area and/or a section of the monitoring area. The monitoring data comprise, for example, monitoring images and/or monitoring videos of objects and/or persons in the monitoring area and/or in the respective section of the monitoring area. The monitoring data are provided to the detection device.

The detection device comprises a plurality of analysis modules. The analysis modules have a data connection to the cameras. In particular, each analysis module has a data connection to precisely one, at least one or more cameras. It is particularly preferred that precisely one camera is assigned to each analysis module. The cameras are designed to provide the monitoring data to the respective analysis module. The analysis modules form separate modules and can be combined into a common super-module, e.g., a housing or computer. Separate modules can be understood to mean, in particular, separate software modules or electronic components. The analysis modules preferably operate without a direct connection between the analysis modules.

The analysis modules in each case preferably form and/or comprise a neural network and/or an artificial intelligence. In particular, the neural networks are designed as deep neural networks and/or as convolutional neural networks. In other words, the detection device comprises a plurality of neural networks. The analysis modules and/or their neural networks are designed and/or trained, for example, to determine different features and/or characteristics on the basis of the respectively provided monitoring data.

The detection device has a shared memory module, especially an extendable shared memory module and/or a plurality of shared memory modules. In particular, the shared memory module forms a memory, preferably an extendable memory. The individual analysis modules are connected to the shared memory module or to the plurality of shared memory modules. All analysis modules preferably have a data connection to the one shared memory module. Data can be transmitted to and/or requested from the shared memory module, for example, by the analysis module by means of the data connection. In particular, the shared memory module is designed as a jointly used memory which the individual analysis modules can access in parallel.

The analysis modules are designed in each case to determine features, also referred to as object features and/or person features, for the provided monitoring data, in particular for the respective time (timestamp). In particular, memory data are queried, requested and/or retrieved by the analysis modules from the shared memory module. The analysis modules retrieve, in particular, associated memory data which are associated with and/or relevant to the respective monitoring data. The analysis modules have, for example, links of memory data and associated monitoring data, for example via the assignment of the camera and/or perspective. The retrieved memory data are therefore then provided to the analysis module.

The analysis modules are designed in each case to determine the features, in particular object features and/or person features, on the basis of the monitoring data, in particular monitoring videos and/or monitoring images, and also the associated memory data. In particular, the analysis modules are designed to determine the features with the monitoring data, in particular with the memory data, by means of the neural network. Memory data are, for example, features, monitoring data and/or metadata, especially of a preceding time and/or results from other analysis modules of the detection device.

It can optionally be provided that the object and/or the person is/are determined, re-recognized and/or recognized on the basis of the specific features. The features are, in particular, characteristic, specific and/or unique features for recognizing and/or distinguishing the objects and/or persons.

The invention is based on the notion of performing the feature determination through the use of a plurality of analysis modules, especially the plurality of, in principle separate, neural networks, so that a particularly lean, fast-processing, trainable and extendable architecture is enabled. In particular, the individual analysis modules are themselves relatively lean and/or require little memory, since they essentially have to store only the currently pending data and/or data to be processed. The actual storage backup and/or data management is/are performed externally in one or more shared modules.

In particular, it is provided that the different analysis modules are connected in each case to different cameras. In particular, the different analysis modules of the detection device in each case evaluate and/or process different monitoring data, monitoring images and/or monitoring videos. In particular, the analysis modules process and/or determine the features for different perspectives, positions and/or angles of view onto the monitoring area. In particular, different features are thus obtained by the analysis modules for different angles of view onto the monitoring area and/or sections of the monitoring area. The cameras are particularly preferably designed to jointly monitor the same object and/or at least one same person and/or to provide this as monitoring data.

It is particularly preferred that a plurality of objects and/or a plurality of persons are disposed in the monitoring area. In particular, the cameras are designed to provide the monitoring data to the analysis modules for this plurality of objects and/or persons. The cameras provide, for example, monitoring images and/or monitoring videos of the plurality of objects and/or the plurality of persons, preferably from different perspectives, to the analysis modules. The analysis modules are in each case designed to determine features for the plurality of objects and/or the plurality of persons, in particular separately and/or specifically for the different objects and/or different persons. The specific features of the different objects and/or persons are provided to the shared memory module. The shared memory modules are designed to store the provided features for the respective objects and/or respective persons. In particular, the shared memory module is designed to store the provided features in an object-specific and/or person-specific manner. Two persons, for example, who are provided by the cameras as monitoring data to the analysis modules are disposed in the monitoring area. One camera records front images as monitoring data, another camera records the rear views of the persons, wherein the analysis modules, here, for example, a first or second analysis module, determine features separately in each case for the two persons, a first analysis module based on front views for the two persons, and a second analysis module for the rear views, likewise separately. The specific features for the individual objects, for example the first person comprising front features and rear features and the second person comprising front and rear features, are preferably saved in the shared memory module.

It is particularly preferred that the analysis modules are designed to provide the determined features, in particular the object and/or persons, specifically to the shared memory module. The provided and/or already saved features are themselves retrievable as memory data from the shared memory module. A first analysis module, for example, already makes memory data based on first monitoring data available to the shared memory module, wherein a further analysis module can retrieve said monitoring data as memory data and/or or can use them for feature determination. This is based on the notion that perspective-independent features are thus determinable, since, for example, an analysis module which evaluates front images of a person can retrieve memory data which describe the object from a rear side.

The detection device preferably has exactly one or at least one gallery module. The gallery module has a data connection to the shared memory module. Data are exchangeable between the gallery module and the shared memory module. The gallery module is designed to save and/or store feature datasets. In particular, the gallery module comprises saved and/or savable feature datasets. The feature datasets are, in particular, designed in each case for objects and/or persons, especially specifically for objects and/or persons. In particular, the feature datasets are designed to comprise specific features for recognizing the object and/or the person.

In particular, the shared memory module is designed to transmit and/or deliver features determined, provided and/or stored for the persons and/or objects in the monitoring area to the gallery module. This design is based on the notion that the determined, provided and/or stored features of the shared memory module can be backed up and saved specifically and/or permanently in the gallery module, in particular after reaching an agreement. The gallery module is designed, for example, to store the features provided by the shared memory module as a new feature dataset if no feature dataset yet exists for this object and/or this person. The gallery module is further designed, for example, for provided features of an already existing feature dataset, to adapt the already existing features in the dataset to the newly provided features and/or to modify said features. An efficient memory usage in the gallery module, for example, is thus achieved.

It is optionally provided that the data connection between the shared memory module and the gallery module is based on and/or uses soft addressing, add vectors and/or delete vectors. In particular, the data connection between the shared memory module and the gallery module uses keys. The gallery module comprises, for example a memory which is writable as a memory matrix M having N rows and W columns. Read and write operations for the memory matrix are described, for example, by read vectors r and write vectors w which are based on weightings $w^r$ (read) and weightings $w^w$ (write): $r=\Sigma_{i=1}^{N} M[i,*]w^r[i]$, where * stands for all j=1, W. For writing to the memory, for example, an erase vector e is first applied and the write vector is then added: v: $M[i,j] \leftarrow M[i,j] (1-w^w[i]e[j])+w^w[i]v[j]$.

One design of the invention provides that the analysis modules are designed to determine features for at least one common object and/or common person, wherein the determined features are provided to the shared memory module, preferably for each object and/or person. Two different objects or persons, for example, are present in the monitoring area, wherein the analysis modules determine the features separately for each of the two objects and/or persons, wherein the analysis modules transmit the features for each of the two objects and/or persons to the shared memory module. The analysis module is designed here to achieve unity with regard to the features of the individual objects and/or persons. Different feature values of a specific feature, for example, are determined for a person and/or an object by two analysis modules, wherein the shared memory module is designed to establish unity with regard to these different values, for example by averaging and/or by prompting the analysis modules to redetermine the features, for example by providing both values and/or disunity information. The shared memory module is preferably designed to provide the features associated with a respective object and/or respective person, especially for which/whom unity is established, as an object dataset and/or person dataset to the gallery module.

The gallery module is designed, in particular, to modify, supplement, or delete already saved feature datasets and/or to create new feature datasets on the basis of the provided object datasets and/or person datasets. The gallery module already comprises, for example, a feature dataset for a specific object and an object dataset is provided by the shared memory module for this object, wherein, if the provided feature values match the saved features, the gallery module retains the existing feature dataset or adapts and/or modifies it in the event of discrepancies.

It is particularly preferred that the feature datasets are designed as object-specific and/or person-specific. In particular, the feature datasets have identification means, for example an ID, numbering and/or designation. The feature datasets of the respective object and/or the respective person in each case comprise features which are based on different perspectives and/or views of the object and/or the person and/or different timestamps. In particular, the feature datasets comprise features of the respective object and/or the respective person which are perspective-independent and/or take into account and/or link different perspectives.

A method for recognizing, in particular re-recognizing, an object and/or a person in the monitoring area forms a further subject-matter of the invention. Monitoring data are recorded from the monitoring area with a plurality of sensors, in particular cameras and/or radar sensors and/or LIDAR sensors and/or movement sensors, wherein the monitoring data in each case comprise video data and/or image data and/or sensor data. Each of the sensors or cameras is connected to one of the analysis modules, in particular a neural network. The analysis modules determine features based on the provided monitoring data. The analysis modules have a data connection to a shared memory module, wherein the analysis modules transmit the determined features to the shared memory module. In particular, the analysis modules can request and/or obtain data from the shared memory module, wherein these data are preferably used in determining the features. In particular, the shared memory module is connected to a gallery module, wherein features determined for an object and/or a person are provided to the gallery module and are backed up there, in particular after reaching an agreement with regard to the individual features.

A computer program for execution on a computer forms a further subject-matter of the invention, wherein the computer program is designed and/or configured, when executed, to carry out the method as described above.

A storage medium, in particular a preferably non-volatile, machine-readable storage medium forms a further subject-matter of the invention. The computer program is stored in the storage medium.

BRIEF DESCRIPTION OF THE DRAWINGS

Further advantages, effects and designs are set out in the attached figures and their description. In the figures.

DETAILED DESCRIPTION

Figure 1:
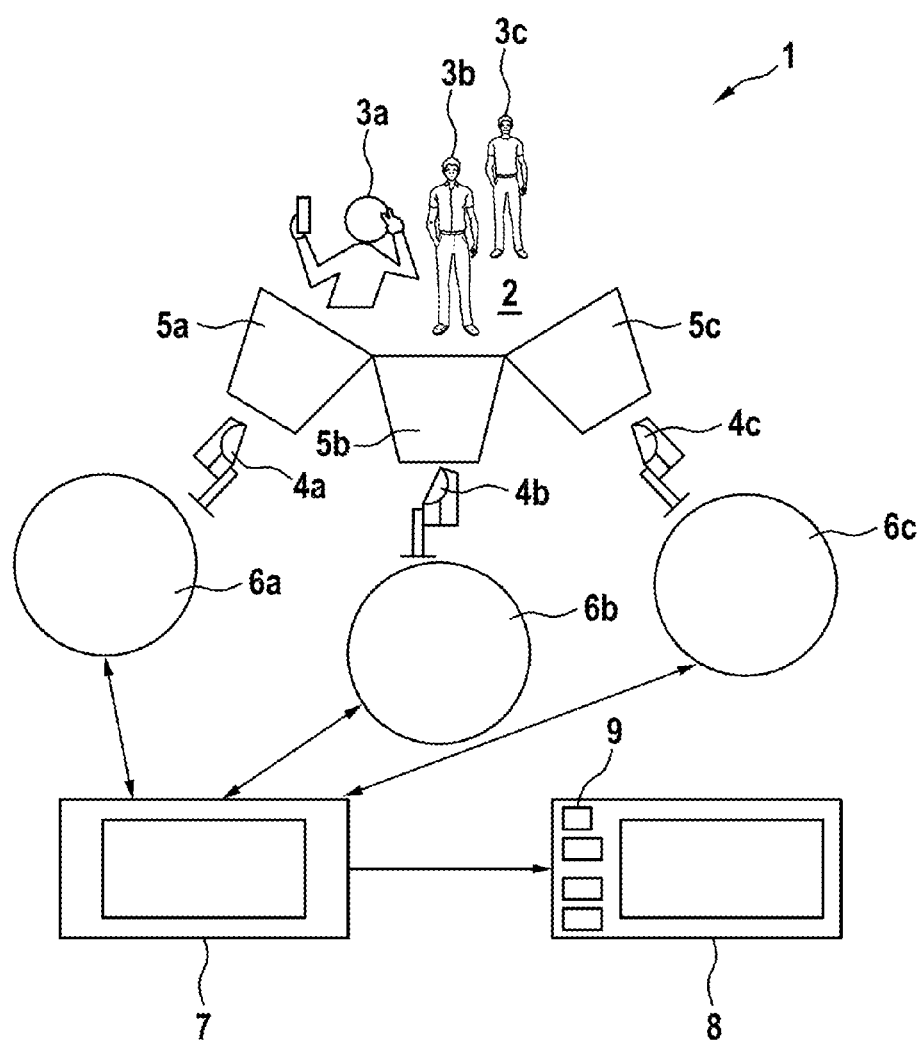
FIG. 1 shows a detection device with a monitoring area.

FIG. 1 shows schematically an example embodiment of a detection device 1 for monitoring a monitoring area 2. A plurality of persons 3a, b, c are disposed in the monitoring area 2. The persons 3a, b, c differ in their appearance, for example size, clothing, gender and age. The monitoring area 2 is monitored with a plurality, here three, of cameras 4a, b, c. The cameras 4a, b, c record the monitoring area 2 in each case from a different perspective 5a, b, c. The cameras 4a, b, c record monitoring images and/or monitoring videos and provide them in each case as monitoring data to an analysis module 6a, b, c. Here, each analysis module 6a, b, c evaluates the monitoring data of the assigned camera 4a, b, c. The analysis modules 6a, b, c comprise and/or are designed as a neural network. The neural network is designed to determine features based on the monitoring images and/or monitoring videos, generally the monitoring data. The features are preferably determined using memory data, wherein the memory data comprise, for example, features of an object and/or a person 3a, b, c determined at a preceding, previous time and/or determined by a different analysis module 6a, b, c.

The detection device 1 comprises a shared memory module 7. The shared memory module 7 has a data connection to the analysis modules 6a, b, c. The data connection is, in particular, a two-way connection, so that data are transmittable and/or requestable in both directions. The analysis modules 6a, b, c are designed to provide the features determined on the basis of the monitoring data to the shared memory module 7. In particular, the analysis modules 6a, b, c can request the memory data from the shared memory module. The shared memory module 7 is designed to temporarily store the provided features, in particular in an object-specific and/or person-specific manner. The analysis modules 6a, b, c and/or the shared memory module 7 are preferably designed to establish links between features to be determined, already determined features from other analysis modules and/or memory data. If features determined by different analysis modules 6a, b, c mutually influence one another, the shared memory module and/or the analysis modules 6a, b, c are designed to establish unity with regard to the features. Once unity has been achieved, the features are provided to the gallery module 8, in particular separately for each object and/or each person.

The gallery module 8 stores the determined features specifically for each object and/or person 3a, b, c. The features are, in particular, perspective-independent. The features are stored, for example, as feature vectors for the individual objects and/or persons. The individual feature vectors and/or feature collections for the individual objects and/or persons are provided with an identification 9, for example an identification number. The feature vector of each object or person can thus be addressed, retrieved, deleted or modified specifically through addressing.

Figure 2:
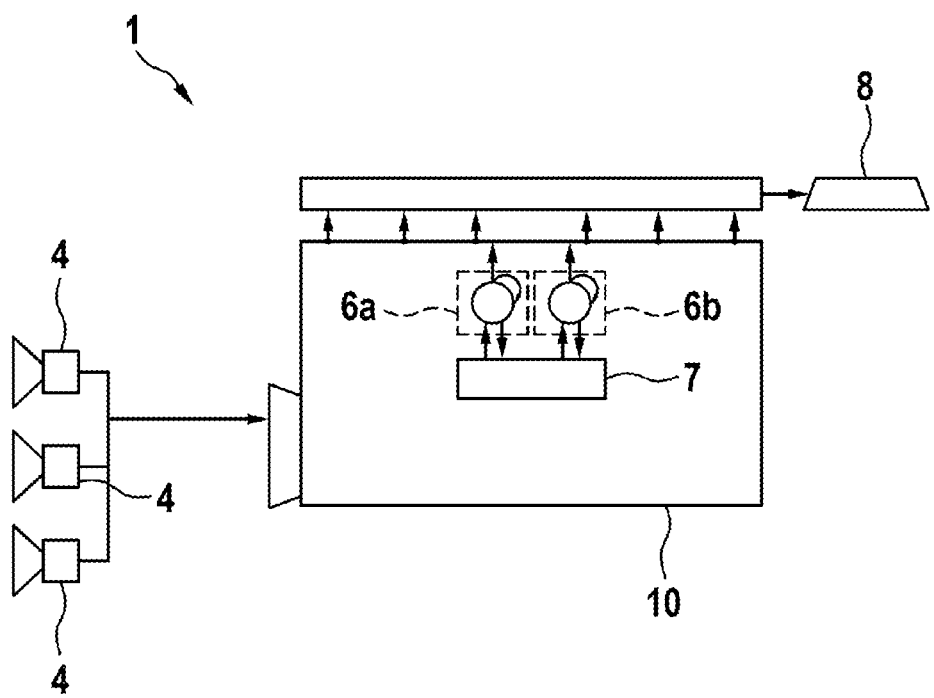
FIG. 2 shows a schematic data flow in the detection device.

FIG. 2 shows schematically an example of the data flow in the detection device from FIG. 1. The analysis modules 6, here, for the sake of clarity, two analysis modules 6a, b, are disposed together with the shared memory module 7 in a common computer module 10. The monitoring data, here monitoring images 11a, b, are provided to this computer module 10. The analysis modules 6a, b in each case receive the monitoring images 11a, b which originate from the camera 4a, b to which they are assigned. The analysis modules in each case have a neural network which examines the monitoring images 11a, b for the presence of features. To do this, memory features, for example features determined at the preceding timestamp, can be retrieved from the shared memory module 7. The features determined by the analysis modules 6a, b, for the timestamp concerned, are provided to the shared memory module 7. The shared memory module 7 transmits the features determined for the respective object or person to the gallery module 8 in which the features are stored specifically for each object and/or each person.

The invention claimed is:

1. A detection device (1) for recognizing an object and/or a person (3, 3a, b, c) in a monitoring area (2) monitored with a plurality of cameras (4, 4a, b, c), the detection device comprising:
a plurality of analysis modules (6, 6a, b, c), wherein the analysis modules (6, 6a, b, c) each have a data connection to a different camera (4, 4a, b, c), and wherein each of the connected cameras (4, 4a, b, c) provides monitoring data of the monitoring area (2) from a different perspective (5, 5a, b, c) to the analysis modules (6, 6a, b, c),
a shared memory module (7), wherein the analysis modules (6, 6a, b, c) have a data connection to the shared memory module (7),
wherein the analysis modules (6, 6a, b, c) are each configured to retrieve memory data associated with the monitoring data of the monitoring area from a different perspective (5, 5a, b, c) provided by a different analysis module from the shared memory module (7),
wherein the analysis modules (6, 6a, b, c) are configured in each case to determine features, object features and/or person features based on the monitoring data and the memory data.

2. The detection device (1) according to claim 1, wherein monitoring data are provided by the cameras (4, 4a, b, c) for at least two objects and/or persons (3, 3a, b, c) in the monitoring area (2), wherein the analysis modules (6, 6a, b, c) are configured to determine the features in each case for the at least two objects and/or persons and provide them to the shared memory module (7), wherein the shared memory module (7) is configured to store the provided features specifically for the respective objects and/or persons (3, 3a, b, c).

3. The detection device (1) according to claim 1, wherein the analysis modules (6, 6a, b, c) are designed to provide the determined features, object features and/or person features to the shared memory module (7), wherein provided features, object features and/or person features are retrievable as memory data.

4. The detection device (1) according to claim 1, characterized by a gallery module (8), wherein the gallery module (8) comprises feature datasets for saved and/or savable objects and/or persons (3, 3a, b, c), wherein the gallery module (8) has a data connection to the shared memory module (7).

5. The detection device (1) according to claim 4, wherein the shared memory module (7) is configured to provide the provided and/or stored features for the respective objects and/or persons (3, 3a, b, c) to the gallery module (8) for storage.

6. The detection device (1) according to claim 4, wherein the data connection of the shared memory module (7) and the gallery module (8) is based on and/or supports soft addressing, add vectors and/or remove vectors.

7. The detection device (1) according to claim 1, wherein the analysis modules (6, 6a, b, c) are configured to determine features for at least one common object and/or person (3, 3a, b, c) in the monitoring area (2) and to provide said features to the shared memory module (7), wherein the analysis modules (6, 6a, b, c) are configured to achieve unity with regard to the respective object and/or the respective person (3, 3a, b, c), wherein the shared memory module (7) is configured to provide the features associated with the object and/or person (3, 3a, b, c) as an object dataset and/or a person dataset to the gallery module (8).

8. The detection device (1) according to claim 4, wherein the gallery module (8) is configured to modify, supplement or delete saved feature datasets and/or to save new feature datasets on the basis of the provided object datasets and/or person datasets.

9. The detection device (1) according to claim 4, wherein the feature datasets are object-specific and/or person specific, wherein the feature datasets comprise features based on different perspectives (5, 5a, b, c) and/or timestamps.

10. The detection device (1) according to claim 4, wherein the feature dataset comprises perspective-independent features.

11. The detection device (1) according to claim 1, wherein the features determined by the analysis modules (6, 6a, b, c) form perspective-independent features.

12. A method for recognizing an object and/or a person (6, 6a, b, c) in a monitoring area (2), by means of a detection device comprising:
a plurality of analysis modules (6, 6a, b, c), wherein the analysis modules (6, 6a, b, c) each have a data connection to a different camera (4, 4a, b, c), and wherein each of the connected cameras (4, 4a, b, c) provides monitoring data from the connected cameras (4, 4a, b, c) of the monitoring area (2) from a different perspective (5, 5a, b, c) to the analysis modules (6, 6a, b, c), and
a shared memory module (7), wherein the analysis modules (6, 6a, b, c) have a data connection to the shared memory module (7),
wherein the analysis modules (6, 6a, b, c) are each configured to retrieve memory data associated with the monitoring data of the monitoring area from a different perspective (5, 5a, b, c) provided by a different analysis module from the shared memory module (7),
wherein the analysis modules (6, 6a, b, c) are configured in each case to determine features, object features and/or person features on the basis of the monitoring data and the memory data,
the method comprising:
processing monitoring data via the plurality of analysis modules (6, 6a, b, c), wherein the analysis modules (6, 6a, b, c) determine features, wherein the analysis modules (6, 6a, b, c) in each case have a neural network and determine the features by means of the neural network, wherein the analysis modules (6, 6a, b, c) share the shared memory module (7) with one another, and
providing, via the analysis modules (6, 6a, b, c), the features to the shared memory module (7).

13. A non-transitory, computer-readable, medium, containing instructions that when executed by a computer cause the computer to:
obtain monitoring data captured by cameras (4, 4a, b, c),
process the monitoring data via a plurality of analysis modules (6, 6a, b, c), wherein the analysis modules (6, 6a, b, c) determine features, wherein the analysis modules (6, 6a, b, c) in each case have a neural network and determine the features by means of the neural network, wherein the analysis modules (6, 6a, b, c) share a shared memory module (7) with one another, and
provide, via the analysis modules (6, 6a, b, c), the features to the shared memory module (7).

* * * * *